United States Patent
El Shafey et al.

(10) Patent No.: US 12,039,982 B2
(45) Date of Patent: Jul. 16, 2024

(54) JOINT AUTOMATIC SPEECH RECOGNITION AND SPEAKER DIARIZATION

(71) Applicant: Google LLC, Mountain View, CA (US)

(72) Inventors: Laurent El Shafey, Mountain View, CA (US); Hagen Soltau, Yorktown Heights, NY (US); Izhak Shafran, Portland, OR (US)

(73) Assignee: Google LLC, Mountain View, CA (US)

( * ) Notice: Subject to any disclaimer, the term of this patent is extended or adjusted under 35 U.S.C. 154(b) by 292 days.

(21) Appl. No.: 17/601,662

(22) PCT Filed: Apr. 6, 2020

(86) PCT No.: PCT/US2020/026937
§ 371 (c)(1),
(2) Date: Oct. 5, 2021

(87) PCT Pub. No.: WO2020/206455
PCT Pub. Date: Oct. 8, 2020

(65) Prior Publication Data
US 2022/0199094 A1 Jun. 23, 2022

Related U.S. Application Data

(60) Provisional application No. 62/830,306, filed on Apr. 5, 2019.

(51) Int. Cl.
*G10L 15/22* (2006.01)
*G10L 15/26* (2006.01)
(Continued)

(52) U.S. Cl.
CPC .............. *G10L 17/18* (2013.01); *G10L 15/22* (2013.01); *G10L 15/26* (2013.01); *G10L 15/30* (2013.01); *G10L 15/063* (2013.01)

(58) Field of Classification Search
CPC ......... G10L 15/22; G10L 15/26; G10L 15/30; G10L 15/32; G10L 15/063; G10L 15/28;
(Continued)

(56) References Cited

U.S. PATENT DOCUMENTS 10,210,860 B1    2/2019  Ward et al.
10,388,272 B1 *  8/2019  Thomson ................ G10L 15/22
(Continued)

FOREIGN PATENT DOCUMENTS

CN    107221333 A    9/2017
CN    108140386 A    6/2018
(Continued)

OTHER PUBLICATIONS

[No Author Listed], "The Rich Transcription Fall 2003 (RT-03F) Evaluation Plan," Oct. 9, 2003, 17 pages.
(Continued)

*Primary Examiner* — Vijay B Chawan
(74) *Attorney, Agent, or Firm* — Fish & Richardson P.C.

(57) ABSTRACT

Methods, systems, and apparatus, including computer programs encoded on computer storage media, for processing audio data using neural networks.

20 Claims, 3 Drawing Sheets

(51) Int. Cl.
    *G10L 15/30* (2013.01)
    *G10L 17/18* (2013.01)
    *G10L 15/06* (2013.01)

(58) Field of Classification Search
CPC ................. G10L 15/197; G10L 15/06; G10L 2015/0631; G10L 17/18
See application file for complete search history.

(56) References Cited

U.S. PATENT DOCUMENTS

| | | | |
|---|---|---|---|
| 10,546,575 B2* | 1/2020 | Dimitriadis | G10L 15/04 |
| 10,559,311 B2* | 2/2020 | Baughman | G10L 17/06 |
| 10,573,312 B1* | 2/2020 | Thomson | G10L 15/22 |
| 10,621,991 B2* | 4/2020 | Zhang | G06N 3/045 |
| 10,672,383 B1* | 6/2020 | Thomson | G06N 20/00 |
| 11,017,778 B1* | 5/2021 | Thomson | G10L 15/28 |
| 11,145,312 B2* | 10/2021 | Thomson | G10L 15/28 |
| 2017/0169815 A1 | 6/2017 | Zhan et al. | |
| 2018/0166066 A1 | 6/2018 | Dimitriadis et al. | |
| 2018/0261236 A1 | 9/2018 | Cao et al. | |
| 2020/0175961 A1* | 6/2020 | Thomson | G10L 15/28 |
| 2020/0175962 A1* | 6/2020 | Thomson | G10L 15/30 |
| 2020/0175987 A1* | 6/2020 | Thomson | G10L 15/26 |
| 2020/0243094 A1* | 7/2020 | Thomson | G10L 15/32 |

FOREIGN PATENT DOCUMENTS

| | | |
|---|---|---|
| CN | 109086264 A | 12/2018 |
| CN | 109147796 A | 1/2019 |
| CN | 109215662 A | 1/2019 |
| GB | 201804073 | 4/2018 |
| JP | H06161495 A | 6/1994 |

OTHER PUBLICATIONS

Ajmera et al., "A robust speaker clustering algorithm," Presented at IEEE Workshop on Automatic Speech Recognition and Understanding, St. Thomas, VI, Nov. 30-Dec. 4, 2003, pp. 411-416.

Anguera et al., "Speaker diarization: A review of recent research," IEEE Transactions on Audio, Speech, and Language Processing, Feb. 2012, 20(2):356-370.

Bagby et al., "Efficient implementation of recurrent neural network transducer in tensorflow," Presented at IEEE Spoken Language Technology Workshop (SLT), Athens, Greece, Dec. 18-21, 2018, pp. 506-512.

Barras et al., "Multistage speaker diarization of broadcast news," IEEE Transactions on Audio, Speech, and Language Processing, Sep. 2006, 14(5):1505-1512.

Bredin, "Tristounet: Triplet loss for speaker turn embedding," Presented at IEEE International Conference on Acoustics, Speech and Signal Processing, New Orleans, LA, Mar. 5-9, 2017, pp. 5430-5434.

Canseco-Rodriguez et al., "Speaker diarization from speech transcripts," Presented at Interspeech 2004, Jeju Island, Korea, Oct. 4-8, 2004, 4 pages.

Chung et al., "Voxceleb2: Deep speaker recognition," Presented at Interspeech 2018, Hyderabad, India, Sep. 2-6, 2018, pp. 1086-1090.

El Shafey et al., "Joint speech recognition and speaker diarization via sequence transduction," arXiv, Jul. 9, 2019, 5 pages.

Garcia-Romero et al., "Speaker diarization using deep neural network embeddings," Presented at IEEE International Conference on Acoustics, Speech and Signal Processing, New Orleans, LA, Mar. 5-9, 2017, 5 pages.

Graves et al., "Connectionist temporal classification: labelling unsegmented sequence data with recurrent neural networks," Presented at Proceedings of the 23rd International Conference on Machine Learning, Pittsburgh, PA, Jun. 25-29, 2006, 8 pages.

Graves et al., "Speech recognition with deep recurrent neural networks," Presented at IEEE International Conference on Acoustics, Speech and Signal Processing, Vancouver, BC, Canada, May 26-31, 2013, pp. 6645-6649.

Graves, "Sequence transduction with recurrent neural networks," arXiv, Nov. 14, 2012, 9 pages.

He et al., "Streaming end-to-end speech recognition for mobile devices," arXiv, Nov. 15, 2018, 5 pages.

Heigold et al., "End-to-end text-dependent speaker verification," Presented at IEEE International Conference on Acoustics, Speech and Signal Processing, Shanghai, China, Mar. 20-25, 2016, pp. 5115-5119.

Hochreiter et al., "Long short-term memory," Neural Computation, Nov. 15, 1997, 9(8):1735-1780.

International Preliminary Report on Patentability in International Appln. No. PCT/US2020/026937, Oct. 14, 2021, 9 pages.

International Search Report and Written Opinion in International Appln. No. PCT/US2020/026937, May 28, 2020, 11 pages.

Jouppi et al., "In-datacenter performance analysis of a tensor processing unit," Presented at ACM/IEEE 44th Annual International Symposium on Computer Architecture, Toronto, ON, Canada, Jun. 24-28, 2017, 12 pages.

Kingma et al., "Adam: A method for stochastic optimization," Presented at International Conference on Learning Representations, San Diego, CA, May 7-9, 2015, 15 pages.

Park et al., "Multimodal speaker segmentation and diarization using lexical and acoustic cues via sequence to sequence neural networks," Presented at Interspeech 2018, Hyderabad, India, Sep. 2-6, 2018, pp. 1373-1377.

Rao et al., "Exploring architectures, data and units for streaming end-to-end speech recognition with RNN-transducer," arXiv, Jan. 2, 2018, 7 pages.

Robinson et al., "The use of recurrent neural networks in continuous speech recognition," Automatic Speech and Speaker Recognition, Mar. 31, 1996, pp. 233-258.

Sell et al., "Diarization is hard: Some experiences and lessons learned for the JHU team in the inaugural DIHARD challenge," Presented at Interspeech 2018, Hyderabad, India, Sep. 2-6, 2018, pp. 2808-2812.

Sell et al., "Speaker diarization with PLDA i-vector scoring and unsupervised calibration," Presented at IEEE Spoken Language Technology Workshop, South Lake Tahoe, NV, Dec. 7-10, 2014, pp. 413-417.

Sim et al., "Improving the efficiency of forward-backward algorithm using batched computation in tensorflow," Presented at IEEE Automatic Speech Recognition and Understanding Workshop, Okinawa, Japan, Dec. 16-20, 2017, pp. 258-264.

Snyder et al., "X-vectors: Robust DNN embeddings for speaker recognition," Presented at IEEE International Conference on Acoustics, Speech and Signal Processing, Calgary, AB, Canada, Apr. 15-20, 2018, pp. 5329-5333.

Soltau et al., "Neural speech recognizer: Acoustic-to-word LSTM model for large vocabulary speech recognition," Presented at Interspeech 2017, Stockholm, Sweden, Aug. 20-24, 2017, pp. 3707-3711.

Soltau et al., "Reducing the computational complexity for whole word models," Presented at IEEE Automatic Speech Recognition and Understanding Workshop, Okinawa, Japan, Dec. 16-20, 2017, pp. 63-68.

Tranter et al., "An overview of automatic speaker diarization systems," IEEE Transactions on Audio, Speech, and Language Processing, Sep. 2006, 14(5):1557-1565.

Virpioja et al., "Morfessor 2.0: Python implementation and extensions for morfessor baseline," Aalto University publication series Science+Technology, 2013, 40 pages.

Waibel et al., "Phoneme recognition using time-delay neural networks," Backpropagation: Theory, Architectures and Applications, Feb. 1, 1995, 19 pages.

Wang et al., "Speaker diarization with LSTM," Presented at IEEE International Conference on Acoustics, Speech and Signal Processing, Calgary, AB, Canada, Apr. 15-20, 2018, pp. 5239-5243.

Zazo et al., "Feature learning with raw-waveform CLDNNs for voice activity detection," Presented at Interspeech 2016, San Francisco, CA, Sep. 8-12, 2016, pp. 3668-3672.

Zhang et al., "Fully supervised speaker diarization," arXiv, Dec. 17, 2018, 5 pages.

(56) References Cited

OTHER PUBLICATIONS

Wei Shuang, "A Method of Optimizing Speech Recognition Using Artificial Neural Network," Digital Technique and Application, Oct. 31, 2017, 2 pages (with English Abstract).
Office Action in Chinese Appln. No. 202080024957.3, dated May 31, 2023, 16 pages (with English Translation).

* cited by examiner hello dr smith <|spk : pt> hello mr jones what brings you here today <spk: dr> I am struggling again with my back pain <spk : pt>

JOINT AUTOMATIC SPEECH RECOGNITION AND SPEAKER DIARIZATION

CROSS-REFERENCE TO RELATED APPLICATION

This application is a national phase entry under 35 U.S.C. 371 of PCT Application Serial No. PCT/US2020/026937, filed Apr. 6, 2020, which claims priority to U.S. Patent Application No. 62/830,306, filed on Apr. 5, 2019, the entire contents of which are herein incorporated by reference.

BACKGROUND

This specification relates to neural networks that perform speech recognition and speaker diarization.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates transcriptions of audio data. In particular, the transcriptions generated by the system identify the words spoken in a given audio segment and, for each of the spoken words, the speaker that spoke the word. The identification of the speaker can be an identification of a speaker role of the speaker in the conversation from a set of possible speaker roles or an identification of a unique speaker from a set of possible unique speakers.

Particular embodiments of the subject matter described in this specification can be implemented so as to realize one or more of the following advantages.

Conventional systems that need to both recognize the spoken words in an audio segment and to identify the speakers of the words combine the outputs of separate ASR and SD systems that each operate on acoustic data (i.e., audio frames) and are trained independently. Combining two such systems at inference, i.e., after training each of the systems separately, results in suboptimal output for several reasons. In particular, it may be difficult to accurately align the outputs of the ASR and SD systems across time, since the SD systems are not constrained to respect word boundaries in the output generated by the ASR system (i.e., because the SD systems also operate on only acoustic data). The described systems, on the other hand, generate an output sequence that both transcribes the words in the audio and identifies the speaker of each of the spoken words. In doing so, the SD output respects word boundaries because the neural network learns through training not to output speaker identity tags in the middle of spoken words. Additionally, the described systems can generate the SD output conditioned on both acoustic cues from the input audio data and linguistic cues from the already recognized speech at any given time step. By incorporating these additional linguistic cues and by configuring the neural network to natively respect word boundaries when generating the SD output, the system can generate high quality SD outputs, i.e., higher quality SD outputs than conventional systems that operate independently of the ASR process. Additionally, existing attempts to combine acoustic cues and linguistic cues (spoken words) have not succeeded in improving diarization. The described techniques, however, effectively combine these cues to generate high quality speaker diarization results. The described system considerably simplifies the engineering overhead in serving this model in production because post-processing (e.g., alignment between speech recognition outputs and diarization outputs in the previous systems) is eliminated. Finally, the described techniques are well-suited for generating rich transcription that includes punctuations and capitalization.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
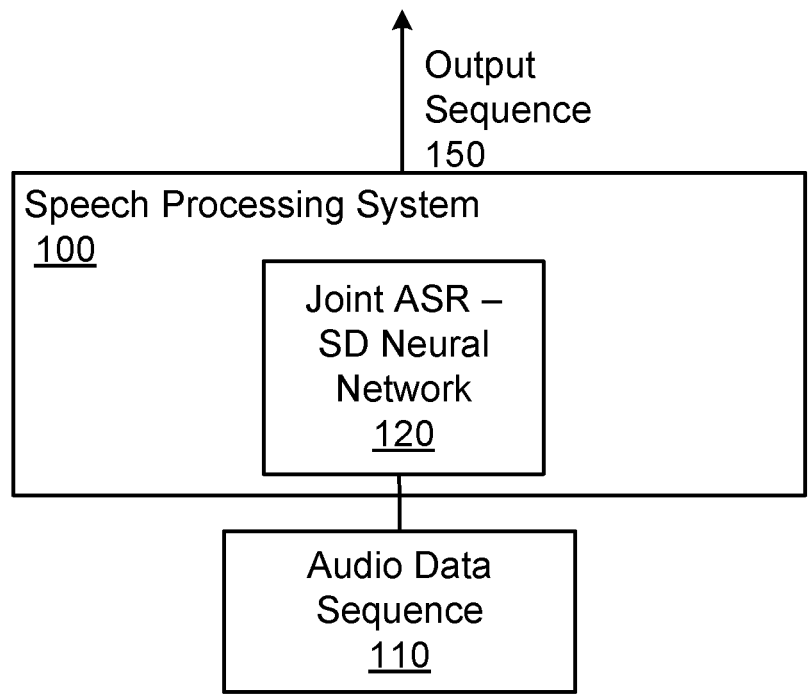
FIG. 1 shows an example speech processing system.

FIG. 1 shows an example speech processing system 100. The speech processing system 100 is an example of a system implemented as computer programs on one or more computers in one or more locations, in which the systems, components, and techniques described below can be implemented.

This system 100 generates transcriptions of audio data. In particular, the transcriptions generated by the system 100 identify the words spoken in a given audio segment and, for each of the spoken words, the speaker that spoke the word, i.e., identify the role of the speaker that spoke the word in a conversation or uniquely identify an individual speaker.

More specifically, the system 100 performs joint automatic speech recognition (ASR) and speaker diarization (SD) by transducing, i.e., mapping, an input sequence of audio data 110 to an output sequence 150 of output symbols using a neural network 120. This neural network 120 is referred to in this specification as "a joint ASR-SD neural network."

The system 100 is referred to as performing "joint" ASR and SD because a single output sequence 150 generated using the neural network 120 defines both the ASR output for the audio data, i.e., which words are spoken in the audio segment, and the SD output for the audio data, i.e., which speaker spoke each of the words.

More specifically, the input sequence of audio data 110 is a sequence of audio frames, e.g., log-mel filterbank energies or other representations of raw audio, and the output symbols in the output sequence 150 are each selected from a set of output symbols that includes both text symbols and speaker label symbols.

The text symbols are symbols that represent some unit of text in a natural language, e.g., phonemes, graphemes, morphemes, characters, word pieces, or words in some natural language. Optionally, the text symbols can also include other units of writing, e.g., punctuation.

The speaker label symbols (also referred to as "speaker identity tags") in the set of output symbols each identify a different speaker from a set of possible speakers.

In some cases, each speaker label symbol identifies a different role from a set of possible roles that a speaker can have in the conversation. For example, the set of output symbols may include a patient speaker label symbol that identifies that a patient is speaking and a doctor speaker label symbol that identifies that a doctor or other medical professional is speaking. As another example, the set of output symbols may include a customer speaker label symbol that identifies that a customer is speaking and a representative speaker label symbol that identifies that a customer service representative is speaking.

In some other cases, each speaker label symbol identifies a different unique individual speaker from a set of possible individual speakers. For example, the set of possible individual speakers can include John Smith, Jane Doe, and John Doe.

The set of output symbols also generally includes a blank output symbol that, when selected as the output at a given time step, indicates that the system is not emitting either a speaker label symbol or a text symbol at the given time step.

Thus, the system 100 generates the output sequence 150 by generating a respective output symbol at each of a plurality of time steps. By allowing the neural network 120 to, at each time step, select from a set of symbols that includes both text symbols that define what words are spoken in the audio input and speaker label symbols that define who is identified as speaking each of the words, the system 100 configures the joint ASR-SD neural network 120 to perform joint ASR and SD, i.e., instead of independently performing ASR and SD on the same input and then merging the results of the two processes.

As used in this specification, the terms "embedding" and "representation" refer to an ordered collection of numeric values, e.g., vectors or matrices of floating point or other numeric values, that represent an input, e.g., that represent an input text token or that represent a span of text tokens.

Once the system 100 has generated an output sequence, the system 100 can either provide the output sequence 150 as the output for the audio data sequence 110, i.e., by storing the output sequence in one or more memories or providing data identifying the outputs in the output sequence for presentation to a user, or can generate a transcription of the audio data sequence 110 from the output sequence 150 and provide the transcription as the output of the system for the audio data sequence 110.

The transcription identifies, from the text symbols in the output sequence 150, the words that are spoken in the audio data sequence 110 and, from the speaker label symbols, which speaker spoke each of the words. An example of a transcription and how the transcription is generated from an output sequence are described below with reference to FIG. 4.

In some implementations, at inference, the system 100 performs a beam search using the neural network 120 in order to generate the final output sequence 150.

In particular, in beam search decoding, the system 100 maintains a "beam" of a certain number of highest-scoring partial sequences and, at each output time step, expands each sequence in the beam by one output symbol (.e., by adding each possible output symbol to each partial sequence). In other words, for a given time step and for each partial output sequence in the beam, the system 100 determines a score distribution for the partial output sequence using the techniques described below. The system 100 then selects, from among all of the partial output sequences, the certain number of expanded output sequences that would have the highest aggregate scores as the partial sequences to be maintained for the next time step. The aggregate scores for each partial sequence can be, e.g., the log likelihoods of the output symbols in the partial sequence according to the score distributions generated for the partial sequence at the corresponding time steps.

Figure 2:
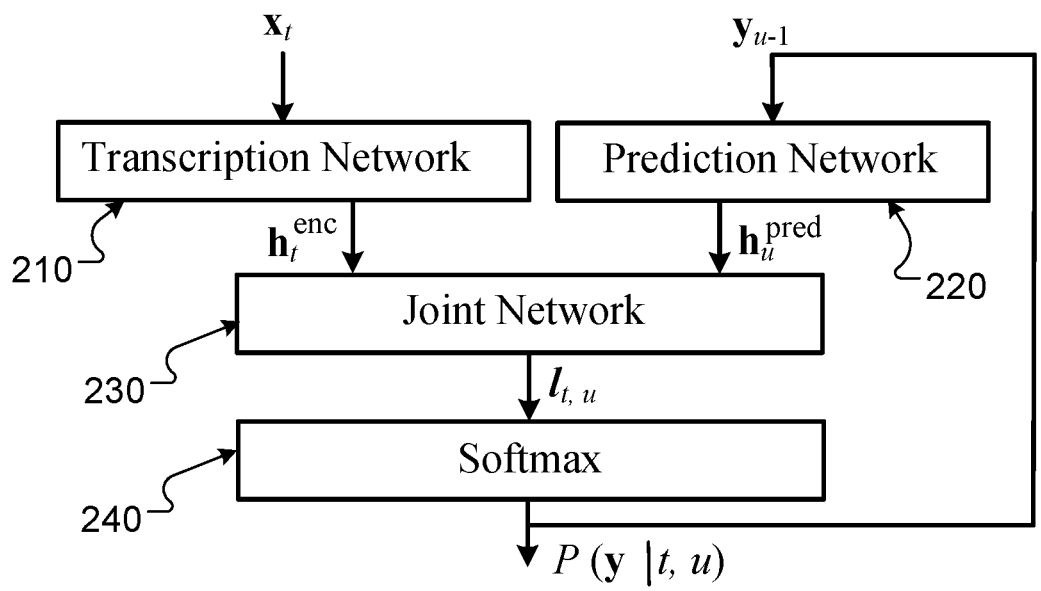
FIG. 2 shows an example architecture of the joint ASR-SD neural network.

FIG. 2 shows an example architecture for the joint ASR-SD neural network 120.

As shown in the example of FIG. 2, the neural network 120 includes a transcription neural network 210, a prediction neural network 220, a joint neural network 230, and a softmax output layer 240.

The transcription neural network 210 is configured to process the audio segment data to generate a respective encoded representation $h_t^{enc}$ for each time step in the output sequence.

For example, the transcription neural network 210 can be a deep recurrent neural network, e.g., one that includes a stack of uni-directional or bi-directional long short-term memory (LSTM) neural network layers or other types of recurrent layers. In some cases, to account for the fact that there are likely to be fewer output time steps than there are audio frames in the audio segment data, the transcription neural network 210 can include one or more time delay neural network (TDNN) layers interspersed among the stack of recurrent layers. The TDNN layers serve to reduce the time resolution of the audio segment data.

The prediction neural network 220 is a neural network that is configured to, at each time step, process a current output symbol $y_{u-1}$ for the time step to generate a prediction representation $h_u^{pred}$ for the time step that is conditioned on any non-blank output symbols that have already been included at any earlier time steps in the output sequence.

The current output symbol $y_{u-1}$ at any given time step is generally the most recently emitted non-blank output symbol in the output sequence, i.e., the output symbol at the most recent time step relative to the given time step after time steps at which the output symbol was the blank output symbol have been disregarded. When no non-blank output symbols have been included at any earlier time steps in the output sequence, e.g., at the first time step in the output sequence, the system can use a fixed placeholder input as the current output symbol.

For example, the prediction neural network 220 can include an embedding layer that maps each non-blank output symbol (and the placeholder output) to a respective embedding followed by one or more uni-directional LSTM or other recurrent layers. In some cases, the last recurrent layer directly generates the prediction representation while in other cases the last recurrent layer is followed by a fully-connected layer that generates the prediction representation.

The joint neural network 230 is a neural network that is configured to, at each time step, process (i) the encoded representation for the audio frame at the time step and (ii) the prediction representation for the time step to generate a set of logits $l_{t,u}$ that includes a respective logit for each of the output symbols in the set of output symbols. As described above, the set of output symbols includes both text symbols and speaker label symbols.

For example, the joint neural network 230 can be a single fully-connected layer that maps the concatenation of (i) the encoded representation and (ii) the prediction representation to the logits or a multi-layer perceptron (MLP) that maps the concatenation of (i) the encoded representation and (ii) the prediction representation to the logits.

The softmax output layer 240 is configured to receive the respective logits $l_{t,u}$ for each of the output symbols and to generate a probability distribution P(y|t,u) over the output symbols in the set of output symbols, i.e., a probability distribution that includes a respective probability for each text symbol, each speaker label symbol, and the blank symbol.

Thus, when the neural network 120 has the architecture described in FIG. 2, to map the audio segment sequence to an output sequence using the neural network 220, the system performs the following operations at each time step:

(1) processing the current output symbol for the time step using the prediction neural network 220 to generate a prediction representation for the time step that is conditioned on any non-blank output symbols that have already been included at any earlier time steps in the output sequence, (2) processing (i) the encoded representation for the time step and (ii) the prediction representation for the time step using the joint neural network 230 to generate a respective logit for each of the output symbols in the set of output symbols, (3) processing the respective logits for each of the output symbols using the softmax output layer 240 to generate a probability distribution over the output symbols in the set of output symbols, and (4) selecting the output symbol at the time step using the probability distribution, e.g., by sampling from the probability distribution or greedily selecting the symbol with the highest probability.

To generate the encoded representations for the time steps, the system can either pre-process the audio sequence using the transcription neural network 210 before the first time step to generate the encoded representations for all of the time steps, or perform the required additional processing necessary to generate the encoded representation for the time step at each time step using the transcription neural network 210.

In some cases, e.g., when performing a beam search as described above, rather than performing step (4), the system performs steps (1)-(3) for each of the k candidate output sequences that are in the beam as of the time step and then updates the beam using the probability distributions for the candidate output sequence, e.g., by generating a candidate set of expanded candidate output sequences that each expand a respective one of the candidate output sequences by one symbol and then maintaining for the next time step the k expanded candidate output sequences that have the highest aggregate scores.

In order for the neural network 120 to be effectively used to generate output sequences, the system trains the neural network 120 on training data that includes training input audio segment sequences and, for each training input audio segment sequence, a corresponding output target. The corresponding output target for each training input sequence is an output sequence that includes text symbols and speaker tag symbols. More specifically, for each word that was spoken in the training input audio segment, the corresponding output target includes, as the next speaker tag symbol after the text symbols corresponding to the word, the speaker tag symbol that identifies the speaker that spoke the word.

In order to train the neural network 120 on the training data, the system can optimize an objective function that measures the conditional probability assigned to the ground truth output sequence by the neural network 120 given the corresponding input audio segment (i.e., by marginalizing over possible alignments that would result in the corresponding audio segment if the blank output symbols were removed) using an algorithm that is referred to as the forward-backward algorithm. Example techniques for training a neural network having the architecture described in FIG. 2 using the forward-backward algorithm are described in K. C. Sim, A. Narayanan, T. Bagby, T. N. Sainath, and M. Bacchiani, "Improving the efficiency of forward-backward algorithm using batched computation in tensorflow," in IEEE Automatic Speech Recognition and Understanding Workshop (ASRU), 2017 and T. Bagby and K. Rao, "Efficient implementation of recurrent neural network transducer in tensorflow," in IEEE Spoken Language Technology Workshop (SLT). IEEE, 2018, the entire contents of which are hereby incorporated by reference herein in their entirety.

Figure 3:
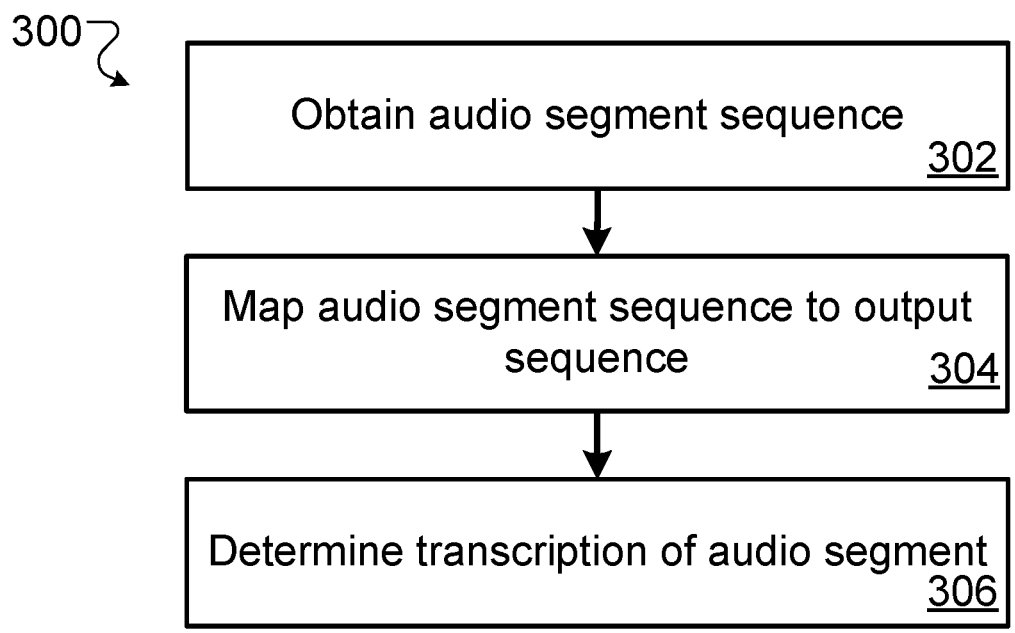
FIG. 3 is a flow diagram of an example process for determining a transcription of an input audio segment sequence.

FIG. 3 is a flow diagram of an example process 300 for processing an audio segment sequence. For convenience, the process 300 will be described as being performed by a system of one or more computers located in one or more locations. For example, an audio processing system, e.g., the system 100 of FIG. 1, appropriately programmed, can perform the process 300.

The system obtains an audio segment sequence characterizing an audio segment (step 302). The audio segment may be an entire conversation or a fixed length, e.g., ten, fifteen, or thirty second, portion of a larger conversation.

More specifically, the audio segment sequence includes a plurality of audio frames. For example, each audio frame can be a d dimensional log-mel filterbank energy, where d is a fixed constant, e.g., fifty, eighty, or one hundred, or a different acoustic feature representation of the corresponding portion of the audio segment.

The system maps, using the joint ASR-SD neural network, the audio segment sequence to an output sequence that includes a respective output symbol for each of a plurality of time steps (step 304).

As described above, for each of the time steps, the output symbol for the time step in the output sequence is selected from a set of output symbols that includes (i) a plurality of text symbols, (ii) a plurality of speaker label symbols, and (iii) a blank symbol.

Moreover, as also described above, the system can either generate the output sequence by maintaining a beam of candidate sequences and then selecting the highest scoring candidate sequence in the beam or by maintaining and updating a single candidate sequence at each time step by sampling or greedily selecting an output symbol from the probability distribution generated by the joint ASR-SD neural network at the time step.

The system then determines, from the output sequence, a transcription of the audio segment data that identifies (i) words spoken in the audio segment and (ii) for each of the spoken words, the speaker from the set of possible speakers that spoke the word (step 306). For example, when the text symbols in the vocabulary are morphemes, the system can identify the words spoken in the transcription by removing all of the blank outputs and then joining adjacent morphemes in the output sequence as appropriate, i.e., by joining morphemes that are marked with a tag that indicates that they are in the middle of a word. The system can then identify the speaker for each of the words by identifying each word as being spoken by the speaker represented by the speaker label symbol that immediately follows the text symbols representing the word in the output sequence.

Figures 4, 5:
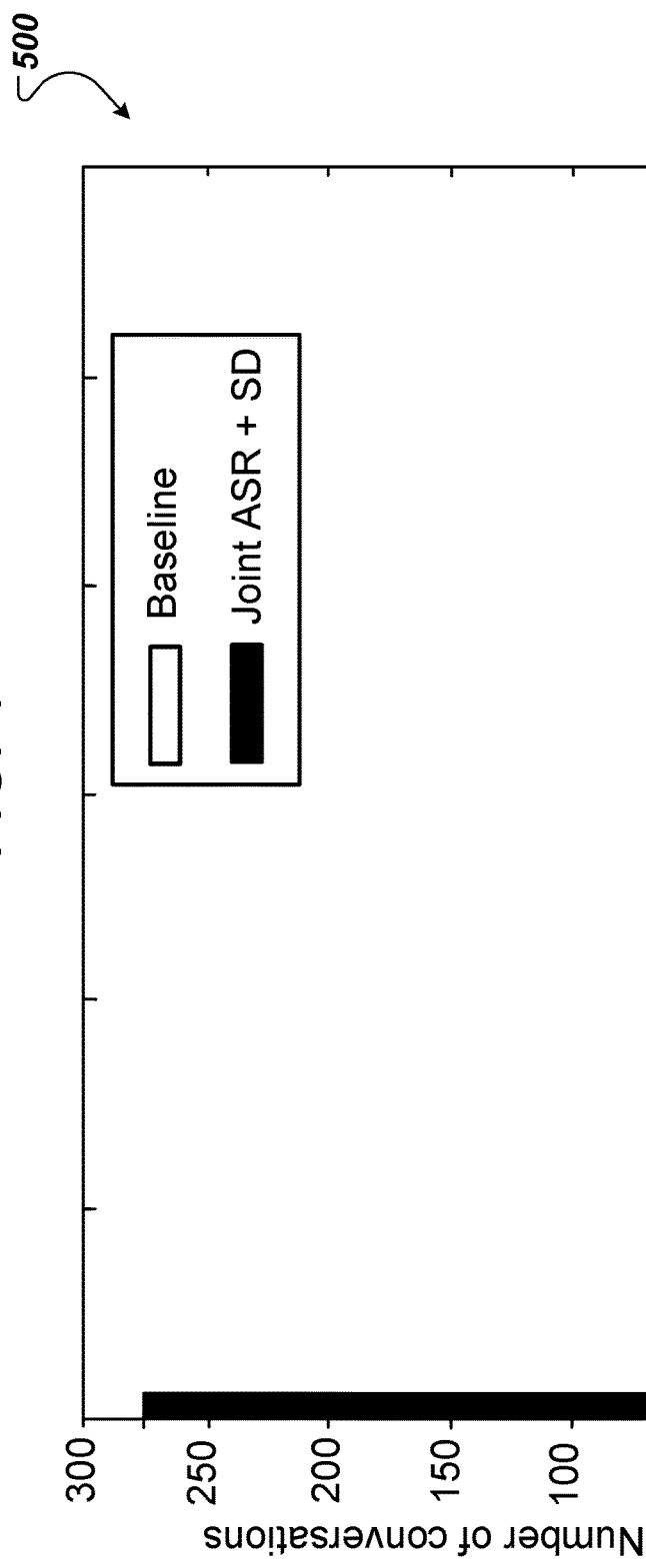
FIG. 4 shows an example transcription generated using the joint ASR-SD neural network.
FIG. 5 is a diagram showing the performance of the described system relative to a baseline system.

FIG. 4 shows an example transcription 400 generated using the joint ASR-SD neural network.

In the example of FIG. 4, the speaker label symbols identify the role of the speaker in the conversation, i.e., instead of uniquely identifying an individual speaker.

Thus, to generate the example transcription 400, the system generated an output sequence that includes text symbols corresponding to the words "hello dr smith," followed by a speaker label <spk:pt> corresponding to the role of "patient." Thus, this portion of the output sequence indicates that the words "hello dr smith" were spoken by a speaker that had the role of patient in the conversation for which the transcription 400 was generated.

More generally, the inclusion of a speaker label in the output sequence indicates that the words corresponding to the text labels that precede the speaker label (i.e., starting from the previous speaker label or, if there is no previous speaker label, starting from the beginning of the output sequence) are predicted to have been spoken by a speaker identified by the speaker label. In other words, for each word represented by a set of text symbols in the output system, the system identifies the word as being spoken by the speaker represented by the speaker label symbol that immediately follows the text symbols representing the word in the output sequence.

Similarly, following the speaker label <spk:pt>, the output sequence included text symbols corresponding to the words "hello mr jones what brings you here today" and then a speaker label <spk:dr> corresponding to the role of "doctor." The system therefore identifies, in the transcription 400, the words "hello mr jones what brings you here today" as being spoken by a speaker with the role of doctor.

The output sequence then included text symbols corresponding to the words "I am struggling again with my back pain," which the system identified as being spoken by the speaker with the role of patient because these text symbols are followed by the speaker label <spk:pt>.

FIG. 5 is a diagram 500 showing the performance of the described system relative to a baseline system.

In particular, the diagram 500 shows the distribution of the Word Diarization Error Rate (WDER) for conversations processed using the described system and the distribution of the WDER for conversations processed by a baseline system.

The baseline system is a system that uses a high-quality ASR neural network to generate the text symbols for the conversation and separately uses a high-quality SD system to identify the speaker tags for portions of the conversation. The baseline system then uses a sophisticated technique for determining when the speaker changes during the conversation and aligning the outputs of the ASR system and the SD system.

However, as can be seen from FIG. 5, the described system consistently generates transcriptions that have a lower, i.e., better, WDER, than the baseline system. More specifically, the distributions shown in the diagram 500 reflect that using the described system results in a substantial improvement in WDER, which drops from 15.8% to 2.2%, a relative improvement of about 86% over the baseline. This gain in WDER comes at a small cost in ASR performance with about 0.6% degradation in word error rate (WER). Thus, as can be seen from FIG. 5, the described system significantly performs the SD performance of the system with minimal to no degradation in ASR performance relative to a high-quality ASR system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining an audio segment sequence characterizing an audio segment, the audio segment sequence comprising a plurality of audio frames;
mapping, using a joint automatic speech recognition-speaker diarization (ASR-SD) neural network, the audio segment sequence to an output sequence comprising a respective output symbol for each of a plurality of time steps, wherein, for each of the time steps, the output symbol for the time step in the output sequence is selected from a set of output symbols that includes (i) a plurality of text symbols, (ii) a plurality of speaker label symbols, each speaker label symbol identifying a different speaker from a set of possible speakers, and (iii) a blank symbol, wherein the respective output symbols in the output sequence comprise a plurality of text symbols and at least one speaker label symbol selected from the plurality of speaker label symbols; and
determining, from the output sequence, a transcription of the audio segment data that identifies (i) words spoken in the audio segment and (ii) for each of the spoken words, the speaker from the set of possible speakers that spoke the word.

2. The method of claim 1, wherein the joint ASR-SD neural network comprises a transcription neural network, and wherein mapping the audio segment sequence comprises:
processing the audio segment sequence using the transcription neural network, wherein the transcription neural network is configured to process the audio segment data to generate a respective encoded representation of each of the plurality of time steps.

3. The method of claim 2, wherein the joint ASR-SD neural network further comprises a prediction neural network, and wherein mapping the audio segment sequence comprises, for each time step:
identifying a current output symbol for the time step, and processing the current output symbol for the time step using the prediction neural network, wherein the prediction neural network is configured to process the current output symbol to generate a prediction representation for the time step conditioned on any non-blank output symbols that have already been included at any earlier time steps in the output sequence.

4. The method of claim 3, wherein the joint ASR-SD neural network comprises a joint neural network and a softmax output layer, and wherein mapping the audio segment sequence comprises, for each time step:
processing the encoded representation for the time step and the prediction representation for the time step to generate a respective logit for each of the output symbols in the set of output symbols; and
processing the logits for the output symbols using the softmax output layer to generate a probability distribution over the output symbols in the set of output symbols.

5. The method of claim 4, wherein mapping the audio segment sequence comprises, for each time step:
selecting an output symbol from the set of output symbols using the probability distribution.

6. The method of claim 1, wherein the text symbols represent phonemes, morphemes, or characters.

7. The method of claim 1, wherein determining, from the output sequence, a transcription of the audio segment data that identifies (i) words spoken in the audio segment and (ii) for each of the spoken words, the speaker from the set of possible speakers that spoke the word comprises:
identifying words represented by the text symbols in the output sequence; and
for each identified word:
identifying a speaker label symbol that immediately follows the text symbols representing the word in the output sequence; and
identifying the word as having been spoken by a speaker represented by the identified speaker label.

8. The method of claim 1, wherein the set of possible speakers is a set of possible speaking roles in a conversation, and wherein each speaker label symbol identifies a different speaking role from the plurality of possible speaking roles.

9. One or more non-transitory computer-readable storage media encoded with instructions that, when executed by one or more computers, cause the one or more computers to perform operations comprising:
obtaining an audio segment sequence characterizing an audio segment, the audio segment sequence comprising a plurality of audio frames;
mapping, using a joint automatic speech recognition-speaker diarization (ASR-SD) neural network, the audio segment sequence to an output sequence comprising a respective output symbol for each of a plurality of time steps, wherein, for each of the time steps, the output symbol for the time step in the output sequence is selected from a set of output symbols that includes (i) a plurality of text symbols, (ii) a plurality of speaker label symbols, each speaker label symbol identifying a different speaker from a set of possible speakers, and (iii) a blank symbol, wherein the respective output symbols in the output sequence comprise a plurality of text symbols and at least one speaker label symbol selected from the plurality of speaker label symbols; and determining, from the output sequence, a transcription of the audio segment data that identifies (i) words spoken in the audio segment and (ii) for each of the spoken words, the speaker from the set of possible speakers that spoke the word.

10. The computer-readable storage media of claim 9, wherein the joint ASR-SD neural network comprises a transcription neural network, and wherein mapping the audio segment sequence comprises:
processing the audio segment sequence using the transcription neural network, wherein the transcription neural network is configured to process the audio segment data to generate a respective encoded representation of each of the plurality of time steps.

11. The computer-readable storage media of claim 10, wherein the joint ASR-SD neural network further comprises a prediction neural network, and wherein mapping the audio segment sequence comprises, for each time step:
identifying a current output symbol for the time step, and
processing the current output symbol for the time step using the prediction neural network, wherein the prediction neural network is configured to process the current output symbol to generate a prediction representation for the time step conditioned on any non-blank output symbols that have already been included at any earlier time steps in the output sequence.

12. The computer-readable storage media of claim 11, wherein the joint ASR-SD neural network comprises a joint neural network and a softmax output layer, and wherein mapping the audio segment sequence comprises, for each time step:
processing the encoded representation for the time step and the prediction representation for the time step to generate a respective logit for each of the output symbols in the set of output symbols; and
processing the logits for the output symbols using the softmax output layer to generate a probability distribution over the output symbols in the set of output symbols.

13. A system comprising one or more computers and one or more storage devices storing instructions that when executed by the one or more computers cause the one or more computers to perform operations comprising:
obtaining an audio segment sequence characterizing an audio segment, the audio segment sequence comprising a plurality of audio frames;
mapping, using a joint automatic speech recognition-speaker diarization (ASR-SD) neural network, the audio segment sequence to an output sequence comprising a respective output symbol for each of a plurality of time steps, wherein, for each of the time steps, the output symbol for the time step in the output sequence is selected from a set of output symbols that includes (i) a plurality of text symbols, (ii) a plurality of speaker label symbols, each speaker label symbol identifying a different speaker from a set of possible speakers, and (iii) a blank symbol, wherein the respective output symbols in the output sequence comprise a plurality of text symbols and at least one speaker label symbol selected from the plurality of speaker label symbols; and determining, from the output sequence, a transcription of the audio segment data that identifies (i) words spoken in the audio segment and (ii) for each of the spoken words, the speaker from the set of possible speakers that spoke the word.

14. The system of claim 13, wherein the joint ASR-SD neural network comprises a transcription neural network, and wherein mapping the audio segment sequence comprises:
processing the audio segment sequence using the transcription neural network, wherein the transcription neural network is configured to process the audio segment data to generate a respective encoded representation of each of the plurality of time steps.

15. The system of claim 14, wherein the joint ASR-SD neural network further comprises a prediction neural network, and wherein mapping the audio segment sequence comprises, for each time step:
identifying a current output symbol for the time step, and
processing the current output symbol for the time step using the prediction neural network, wherein the prediction neural network is configured to process the current output symbol to generate a prediction representation for the time step conditioned on any non-blank output symbols that have already been included at any earlier time steps in the output sequence.

16. The system of claim 15, wherein the joint ASR-SD neural network comprises a joint neural network and a softmax output layer, and wherein mapping the audio segment sequence comprises, for each time step:
processing the encoded representation for the time step and the prediction representation for the time step to generate a respective logit for each of the output symbols in the set of output symbols; and
processing the logits for the output symbols using the softmax output layer to generate a probability distribution over the output symbols in the set of output symbols.

17. The system of claim 16, wherein mapping the audio segment sequence comprises, for each time step:
selecting an output symbol from the set of output symbols using the probability distribution.

18. The system of claim 13, wherein the text symbols represent phonemes, morphemes, or characters.

19. The system of claim 13, wherein determining, from the output sequence, a transcription of the audio segment data that identifies (i) words spoken in the audio segment and (ii) for each of the spoken words, the speaker from the set of possible speakers that spoke the word comprises:
identifying words represented by the text symbols in the output sequence; and
for each identified word:
identifying a speaker label symbol that immediately follows the text symbols representing the word in the output sequence; and
identifying the word as having been spoken by a speaker represented by the identified speaker label.

20. The system of claim 13, wherein the set of possible speakers is a set of possible speaking roles in a conversation, and wherein each speaker label symbol identifies a different speaking role from the plurality of possible speaking roles.

* * * * *